United States Patent Office 3,220,987
Patented Nov. 30, 1965

3,220,987
METHOD OF PREPARING TITANOXANE POLYMERS
Sydney Arthur Giddings, Darien, Conn., assignor to American Cyanamid Company, Stamford, Conn., a corporation of Maine
No Drawing. Filed Aug. 5, 1963, Ser. No. 300,073
10 Claims. (Cl. 260—80)

This application is a continuation-in-part of copending application Serial No. 179,773, filed March 14, 1962, now abandoned.

This invention relates broadly to a new and useful method of preparing metaloxane polymers and, more particularly, to a new and improved method of preparing polymers from a substituted titanium halide whereby there are obtained polymers of an oxygen-containing compound of titanium.

In a more particular sense, the invention is concerned with the preparation of polymers derived from a compound represented by the general formula (I) 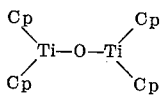

wherein each Cp represents a radical selected from the group consisting of cyclopentadienyl (unsubstituted cyclopentadienyl) and the lower alkyl-substituted cyclopentadienyl radicals. The radicals represented by Cp may be the same or different. The polymer obtained by polymerizing the compound of Formula I contains the essential recurring unit represented by the general formula (II) 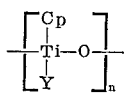

where Cp has the same meaning as given above with reference to Formula I, Y is another Cp group and/or a chain of metaloxane polymeric material such as that of Formula II, and $n$ is a number having an average value of at least 2, for example from 2 to 1,000 or more.

Broadly described, the polymers with which the present invention is concerned are prepared in accordance with the following equations:

(III)

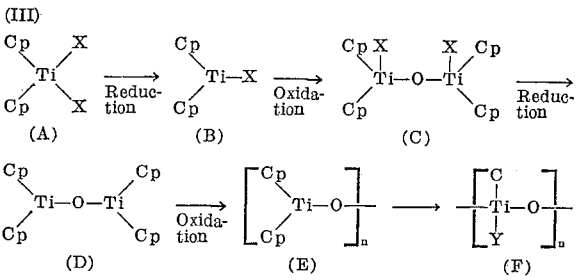

In the foregoing equations Cp, Y and $n$ have the same meanings as given above with reference to Formulae I and II, respectively, and X represents a halogen selected from the group consisting of chlorine and bromine.

The method of the present invention provides a simple and relatively inexpensive technique for preparing thermally stable polymers with a metaloxane, specifically a titanoxane, backbone. Previous methods of preparing similar polymers involve either condensation reactions between reactants that are often difficult and expensive to prepare, or are difficult to condense, or yield thermally unstable polymers.

No pertinent prior art is known. Thomas et al. Patent No. 2,983,740 discloses the compound represented by the formula $[(C_5H_5)_2TiCl]_2O$. Of incidental interest, also, are British Patent 793,354 which discloses the preparation of condensed cyclopentadienyl titane; and British Patent No. 793,355 which discloses bis-(cyclopentadienyl) titanium dihalide.

Illustrative examples of lower alkyl-substituted cyclopentadienyl radicals represented by each Cp in Formula I are the monomethyl-, dimethyl-, trimethyl- and tetramethylcyclopentadienyl radicals, and the mono- and poly-(i.e., di-, tri- and tetra-) ethyl-, propyl-, isopropyl-, n-butyl-, isobutyl-, sec.-butyl-, n-amyl-, isoamyl-, etc., cyclopentadienyl radicals.

As indicated by the equations designated generally as III, the compound identified as III(C) and which is exemplified by bis(dicyclopentadienylchlorotitanium) oxide and bis(dicyclopentadienylbromotitanium)oxide is advantageously produced by reducing the corresponding bis(cyclopentadienyl) titanium dihalide to the corresponding bis(cyclopentadienyl) titanium halide, followed by the oxidation of the latter to III(C). This is done by any suitable means using any suitable reducing and oxidizing agents, for instance as is described in examples which follow.

Compound III(C) is then reduced with a hydride selected from at least one member of the group consisting of the hydrides of boron and the alkali-metal (sodium, potassium, lithium, caesium and rubidium) boron hydrides. The hydrides of boron used in practicing the instant invention include, for example, diborane ($B_2H_6$) to decaborane ($B_{10}H_{14}$), inclusive, and the other known hydrides of boron embraced by the general formula $B_xH_y$. (In this connection see the abstract presented by McCarthy, Bragg and Norton in the October 13, 1950, issue of Science vol. 112, p. 425.) Diborane, which is commercially available, is the preferred hydride of boron that is employed. It is a gaseous boron hydride which undergoes rapid decomposition at 100° C. and may be used as a starting material for preparing other boron hydrides.

Instead of a boron hydride one can use an alkali-metal boron hydride either alone or in combination with a hydride of boron in any proportions; or one can use mixtures of different hydrides of boron in any proportions, or mixtures of any alkali-metal boron hydrides in any proportions. If the induction period when using an alkali-metal boron hydride is slow, it can be "triggered" and the induction period shortened by the addition of a small amount of a boron hydride, advantageously diborane.

The reduction of compound III(C) with the reducing agent is carried out under anhydrous conditions and under an atmosphere of an inert gas, e.g., nitrogen, helium, argon, krypton and the like.

Ordinarily, if compound III(C) is not already present in an inert, anhydrous (substantially completely anhydrous), liquid solvent (or diluent), it is placed in such a reaction medium, e.g., in the form of a suspension and/or dispersion and/or solution, or the like. I prefer to use as the liquid reaction medium an inert, anhydrous, liquid "solvent" (within which term is intended to be included both true solvents as well as diluents and mixtures of true solvents and diluents) selected from the group consisting of inert, anhydrous, liquid ethers and ketones. Optimum results have been obtained by the use of such ethers and ketones and which, of course, are free from reactive groups such, for example, as —OH groups.

As has been indicated hereinbefore, the liquid medium in which the reaction is effected is an anhydrous (substantially completely anhydrous), liquid medium which is inert (substantially completely inert) during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. By "inert" or "substantially completely inert," liquid, reaction medium is meant one which is so inert or non-reactive toward the reactants and the reaction product that it will not affect the course of the reaction or the constitution of the reaction product. By "liquid reaction medium" is meant one which is liquid at the temperature and pressure employed in effecting the reaction. In other words, the inert, anhydrous, liquid, reaction medium may or may not be a liquid at room temperature or at any other temperature below the reaction temperature.

Advantageously the reaction medium is one in which compound III(C) is at least slightly soluble. Also, preferably, the liquid reaction medium is one which is volatile (volatilizable) without decomposition.

Illustrative examples of liquid reaction media that can be employed, including those of the preferred kind, are diethyl ether, di-n-propyl ether, di-isopropyl ether, di-n-butyl ether, di-n-amyl ether, the mixed normal and isomeric diamyl ethers, methyl butyl ether, diglycoldimethyl ether, tetrahydrofuran, tetrahydro-2-methylfuran, m-dioxane (1,3-dioxane), p-dioxane (1,4-dioxane), pentamethylene oxide, 2-methyl-1,3-dioxolane, N-methylmorpholine, N-ethylmorpholine, acetone, diethyl and the various other di-(lower alkyl) ketones, including both the normal and various isomeric forms, e.g., the normal and various isomeric dibutyl and diamyl ketones, methyl ethyl ketone, methyl propyl ketone, methyl butyl ketone, methyl amyl ketone, ethyl amyl ketone, methyl benzyl ketone, ethyl benzyl ketone, methyl phenyl ketone (acetophenone), etc. Preferably the liquid reaction medium is an ether and/or a ketone that boils below 200° C., and usually is one which boils below about 150° C., more particularly below about 100° C. Mixtures of different ethers may be used as the reaction medium; or mixtures of different ketones; or mixtures of ethers and ketones in any proportions. Mixtures of liquid aliphatic ethers and cyclic ethers in any proportions can be used as the reaction medium.

The ether and/or ketone liquid reaction medium can be used alone as the reaction medium or it can be employed in the form of an admixture with other liquid reaction media with which it is miscible, for instance, liquid aromatic hydrocarbons such, for example, as benzene, toluene, xylene, etc. In such admixtures the additive to the liquid ether and/or ketone liquid reaction medium may constitute, for example, from about 1% to about 75% by volume of the total volume of the said additive and the said ether and/or ketone liquid reaction medium.

The amount of inert, anhydrous, liquid, reaction medium employed may be varied as desired or as conditions may require, but ordinarily the amount thereof is such that the reactants constitute from about 1% to about 20% by weight thereof.

The reducing agent (a boron hydride and/or an alkali-metal boron hydride) may be brought into reactive relationship with compound III(C) in any suitable manner. If the reducing agent is a gas such, for example, as diborane, it may be bubbled slowly into the reaction mass throughout the entire reaction period. If it is a liquid or a solid it may be added all at once or in increments to the reaction mass throughout all or a portion of the period of the reaction.

The temperature at which the reduction of compound III(C) is effected is usually room temperature (20°–30° C.), that is, in the absence of applied heat or only such heat as may be necessary to convert the reaction medium to liquid state if it is not already in such state. A maximum temperature of reaction up to the decomposition temperature of the reduction product (i.e., compound III(D) is not precluded. Ordinarily, however, the reaction is carried out at the lowest possible temperature that will provide maximum reduction in minimum time. Such a temperature is usually within the range of from about −20° C. up to the boiling or reflux temperature of the reaction mass at atmospheric pressure. Superatmospheric pressures can be employed when it is desired to effect the reaction at a temperature above the boiling temperature of the reaction mass at atmospheric pressure.

The amount of a hydride of boron and/or an alkali-metal borohydride that is employed should be in molar excess of the amount theoretically required to reduce compound III(C) to compound III(D) if it is desired to obtain maximum reduction in a minimum of time.

The reduction product, compound III(D), is relatively unstable if isolated from the reaction mass. Surprisingly it has been found that it is unnecessary to isolate the product from the reaction mass and that, at the end of the reduction period, it can be immediately oxidized while it is present in the reaction medium in which it was formed.

Any suitable method can be used for oxidizing compound III(D) to a polymer thereof. Any source of oxygen can be employed, including oxygen derived from hydrogen peroxide, or from any of the organic and inorganic peroxides, e.g., benzoyl peroxide, acetyl peroxide, phthaloyl peroxide, cinnamyl peroxide, tert.-butyl hydroperoxide, sodium and potassium peroxides and others such, for instance, as those mentioned in U.S. Patent No. 2,550,652, col. 4, line 72 through line 39, col. 5. The most economical and convenient source of oxygen is to bubble dry gaseous oxygen or dry air, or any other dry oxygen-containing gas, through the reaction mass until a maximum yield of polymer has separated therefrom. Usually this is done while the reaction mass is at room temperature (20°–30° C.), but, if desired, the reaction mass may be within the same range described above with reference to the reduction of compound III(C) to compound III(D).

At the end of the oxidation reaction period the polymer is isolated, e.g., by filtration, centrifuging, etc., and the isolated polymer is then washed, e.g., with water, to remove any water-soluble inorganic salts formed as by-products of the reaction.

The polymer which is produced by means of the present invention and exemplified by Formula III(E) is unstable and readily converts to a cross-linked polymer in which the average number of Cp groups per titanium atom is reduced significantly. The cross-linking reactions can occur on standing in solution, during the isolation of the polymer or while it is a solid material. From the carbon to titanium atomic ratio, which indicates the ratio of Cp groups to titanium atom in the polymeric units, it can be said that the ratio may be from about 5.2 to 7 and more usually about 5.5 to 5.9. Theoretically, the carbon to titanium atomic ratio of a dicyclopentadienyl substituted polymeric unit is 10:1. Thus it can be seen that for carbon ratios of 5.5–5.9:1, there are two Cp groups for every 6th or 10th titanium atom in the polymer chain. Referring to Formula III(F), Y is a Cp group for every 6th or 10th titanium atom in the polymer and the other titanium atoms are cross linked.

The polymers resulting from the method of this invention are generally yellow, relatively soft, infusible powders as normally obtained. They are stable in air and also have relatively high thermal stability. They are insoluble in most of the common organic solvents. For example, the polymer obtained by the oxidation of bis(dicyclopentadienyltitanium)oxide is insoluble in benzene, toluene, xylene, acetone, chloroform, diethyl ether, methylene chloride, carbon tetrachloride, tetrahydrofuran, nitromethane, dimethylformamide, dimethylsulfoxide, diglyme, diphenyl ether, glycol monomethyl ether and dioxane. This same polymer is stable upon heating to 260° C. but slowly decomposes with an increase in temperature above 260° C. The same general order of thermal stability is shown by other polymers produced by the method of this invention.

The polymers produced by the method of this invention are useful, for example, as pigments and as modifiers of thermoplastic and thermosetting resinous compositions of all kinds. They are particularly useful as components of thermoplastic and thermosetting resinous materials having a relatively low thermal stability in order to improve the stability of such resins against heat. For example, they may be used advantageously as fillers and/or pigments in polystyrene molding compositions (including expandable or foamable polystyrene) in order to increase the resistance of the molded article to heat.

In order that those skilled in the art may better understand how the present invention can be carried into effect, the following examples are given by way of illustration and not by way of limitation. All parts and percentages are by weight unless otherwise stated.

*Example 1*

A. PREPARATION OF [Ti(Cp)$_2$Cl]$_2$O

Bis-cyclopentadienyl titanium dichloride (50 g.; 0.20 mole) and powdered zinc (10 g.; 0.153 mole) are reacted with stirring in 250 ml. of anhydrous acetone at room temperature (20°–30° C.) under an inert atmosphere, specifically an atmosphere of argon, for one hour. At the end of this period of time the reaction mass is filtered and the resulting green solution containing dissolved bis-(cyclopentadienyl)titanium chloride is oxidized by a slow ingress of an oxygen-containing gas in dry state, specifically dry air. Orange-red crystals comprising bis(dicyclopentadienylchlorotitanium)oxide separate from the solution and are filtered off. Upon recrystallization from acetone, the purified material is obtained in a yield of 26.5 g., corresponding to about 60% of the theoretical. The foregoing reactions may be represented by the following equations:

(IV)    $2Ti(Cp)_2Cl_2 + Zn \rightarrow Ti(Cp)_2Cl + ZnCl_2$ (V)     $2Ti(Cp)_2Cl + O_2 \rightarrow [Ti(Cp)_2Cl]_2O$ B. PREPARATION OF (Cp)$_2$Ti—O—Ti(Cp)$_2$ Twenty (20 g.) of [Ti(Cp)$_2$Cl]$_2$O (0.045 mole) in 1000 ml. of anhydrous tetrahydrofuran, under an atmosphere of argon, is reduced by bubbling diborane gas through the solution. The initial orange color of the solution changes to a blue-green color. The reaction is continued for 16 hours to insure complete reduction of the starting material to bis(dicyclopentadienyltitanium)-oxide. This reaction may be represented by the following equation:

(VI)    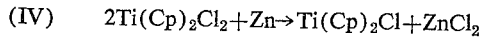

C. PREPARATION OF POLYMER

Without isolating the reduction product from the reaction mass dry air (i.e., anhydrous air) is then passed slowly through the solution at room temperature. (20°–30° C.). A yellow polymer separates. This polymer is filtered off and washed with water to remove any water-soluble inorganic salts formed as by-products of the reaction. The polymer was analyzed and found to contain 38.2% C, 4.25% H, and 25.5% Ti on a weight basis. The yield of polymer amounts to 5.4 g. This reaction may be represented by the following equation:

(VII)

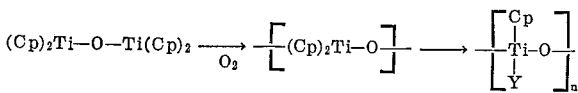

*Example 2*

Essentially the same procedure is followed as described under Example 1 with the exception that, instead of bis-cyclopentadienyl titanium dichloride, there is used an equivalent molar amount of monocyclopentadienyl monomethylcyclopentadienyl titanium dichloride, which is then reduced with zinc in anhydrous acetone, with stirring, to obtain the corresponding monochloride. The latter is then oxidized as in I(A) to bis(cyclopentadienyl methylcyclopentadienylchlorotitanium)oxide. An equivalent molar amount of this compound, instead of bis(dicyclopentadienylchlorotitanium)oxide, is then reduced in 1000 ml. anhydrous dipropyl ether (instead of tetrahydrofuran as in I(B)) to the compound represented by the formula (VIII) 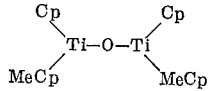

This compound is then oxidized to a substantially insoluble, substantially infusible polymer as in I(C), which polymer is isolated and purified as therein described.

Instead of using diborane as in Examples 1 and 2 as the reducing agent, similar results are obtained when any of the other boron hydrides are employed including, for example, tetraborane (also known as tetraborane-10), B$_4$H$_{10}$, dimethylenetetraborane-10, C$_2$H$_4$B$_4$H$_8$, pentaborane, B$_5$H$_9$, the various liquid alkylated pentaboranes (see, for instance, U.S. Patent No. 2,983,760 for specific examples and method of preparation), decaborane, B$_{10}$H$_{14}$, and the various liquid and solid alkylated decaboranes. Such boranes in their normal form may be added initially or in increments to the reaction mass; or, those which volatilize without decomposition can be gasified, if desired, and bubbled into the reaction mass in the same manner as diborane.

*Example 3*

Bis(methylcyclopentadienyl)titanium dibromide (73.2 g.; 0.20 mole) and finely divided zinc metal (13.0 g.; 0.2 mole) are reacted with stirring in 250 ml. of anhydrous diglyme (dimethyl ether of diethylene glycol) at room temperature (20°–30° C.) under an atmosphere of nitrogen for one hour. The reaction mass is then filtered, and the resulting green solution is oxidized, isolated and purified as in Example 1 to give [Ti(MeCp)$_2$Br]$_2$O. Forty (40) grams of the product prepared as above-described (0.068 mole) in 1000 ml. of anhydrous methyl ethyl ketone is refluxed with 5.2 g. (0.14 mole) of sodium borohydride. Advantageously a trace of diborane gas is introduced to accelerate the initiation of the reduction reaction. The reaction mass is heated under reflux at the boiling temperature of the mass for three hours. Without isolating the reduction product, the said product is oxidized and the polymeric oxidation product is isolated in essentially the same manner as described under Example 1 with reference to the corresponding product of that example.

*Example 4*

Essentially the same procedure is followed as described under Example 3 with the exception that an equivalent molar amount of the corresponding dichloride is used instead of bis(methylcyclopentadienyl)titanium dibromide, and diethyl ketone is the inert, anhydrous, liquid, reaction medium in which the reduction of [Ti(MeCp)$_2$Cl]$_2$O is effected, followed by oxidation to yield a substantially insoluble, substantially infusible polymer. Also, instead of using sodium borohydride as the reducing agent, there is employed an equivalent molar amount of potassium borohydride.

In place of sodium or potassium borohydrides in Examples 3 and 4, one can use any of the other alkalimetal borohydrides or any of the hydrides of boron, numerous examples of which have been given hereinbefore.

Also, instead of the particular inert, anhydrous, liquid reaction media employed in the final reduction and oxidation steps of the foregoing examples, one can employ any other such media, preferably an ether or a ketone, which meet these requirements and of which numerous examples previously have been given.

*Example 5*

This example illustrates the use of a polymer resulting from the method of this invention, specifically the poly- (dicyclopentadienyltitanoxane) of Example 1, as a modifier of a synthetic resin, more particularly a melamine-formaldehyde resin.

| | Parts |
|---|---|
| Melamine-formaldehyde resin [1] | 600 |
| Polymer of Example 1 | 90 |
| Alpha-cellulose | 300 |
| Mold lubricant, specifically zinc stearate | 10 |

[1] This resin is a dry, heat-curable material obtained by reaction of melamine and formaldehyde in the ratio of 1 mole of the former to 2 moles of the latter.

The above ingredients are blended together in a mixing unit for 1½ hours. The mixture is further worked on differential rolls having a clearance of 60 mils therebetween. The hot roll (fast roll) is at a temperature of about 150° C. at the beginning and about 140° C. at the end, while the temperature of the cold roll (slow roll) is 100° C. The modifying polymer of Example 1 blends in readily. The sheet forms on the cold roll, is transferred to the hot roll in 5 to 7 minutes, and is removed from the latter in 8 minutes. The sheet shows good plasticity on the rolls and is removed in a single sheet. It is translucent, cream- (almost yellow-) colored, and very flexible and strong when cold. The sheet is broken and ground in an Abbè cutter through a ⅛" screen to form a molding compound for test purposes.

A molded article is produced by molding a sample of the molding compound for 6 minutes at 170° C. under a pressure of about 5000 pounds per square inch. A well-molded product having good strength characteristics, a good surface appearance and a relatively high thermal stability is obtained.

I claim:

1. The method of preparing a synthetic polymer which comprises oxidizing a compound represented by the general formula

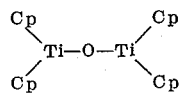

where each Cp represents a radical selected from the group consisting of cyclopentadienyl and lower alkyl-substituted cyclopentadienyl radicals.

2. A method as in claim 1 wherein the starting compound from which the polymer is made is oxidized with an oxygen-containing gas.

3. A method as in claim 2 wherein oxidation of the starting compound with an oxygen-containing gas is effected while the said compound is in an inert, anhydrous, liquid solvent selected from the group consisting of inert, anhydrous, liquid ethers and ketones.

4. A method as in claim 3 wherein oxidation is effected at a temperature within the range of from about —20° C. to the reflux temperature of the reaction mass at atmospheric pressure.

5. The method of preparing a synthetic polymer which comprises oxidizing, with an oxygen-containing gas, a compound represented by the formula

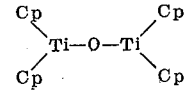

wherein each Cp represents a cyclopentadienyl radical while the said polymer is in an inert, anhydrous, liquid solvent selected from the group consisting of inert, anhydrous, liquid ethers and ketones, the oxidation being effected at a temperature within the range of from about —20° C. to the reflux temperature of the reaction mass at atmospheric pressure.

6. The method which comprises reducing, with a hydride selected from at least one member of the group consisting of the hydrides of boron and the alkali-metal boron hydrides, a compound represented by the general formula

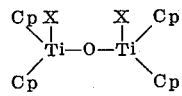

wherein each Cp represents a radical selected from the group consisting of cyclopentadienyl and lower alkyl-substituted cyclopentadienyl radicals, and each X represents a halogen selected from the group consisting of chlorine and bromine, said reduction being effected under an inert, anhydrous atmosphere while the compound represented by the aforementioned general formula is in an inert, anhydrous, liquid solvent selected from the group consisting of inert, anhydrous, liquid ethers and ketones, the reduction product being a compound represented by the general formula

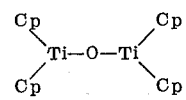

wherein Cp has the same meaning as given above; and, without isolating the said reduction product from the reaction mass, oxidizing the said product to a polymer thereof by passing a dry oxygen-containing gas through the reaction mass until the optimum amount of polymer has been formed, the oxidation being effected at a temperature within the range of from about —20° C. to the boiling temperature of the reaction mass.

7. A method as in claim 6 wherein X in the first formula appearing therein represents chlorine.

8. A method as in claim 6 wherein each Cp in the formulas appearing therein represents the cyclopentadienyl radical.

9. A method as in claim 6 wherein the hydride is diborane.

10. A method as in claim 6 wherein the hydride is diborane and the inert, anhydrous, liquid solvent is tetrahydrofuran.

References Cited by the Examiner

UNITED STATES PATENTS 3,027,392   3/1962   Herman _____ 260—429.5

MURRAY TILLMAN, *Primary Examiner.*

SAMUEL H. BLECH, *Examiner.*